S. P. BUSH.
BRAKE SHOE.
APPLICATION FILED JAN. 21, 1908.
902,206.
Patented Oct. 27, 1908.
2 SHEETS—SHEET 1.
Fig. 1.
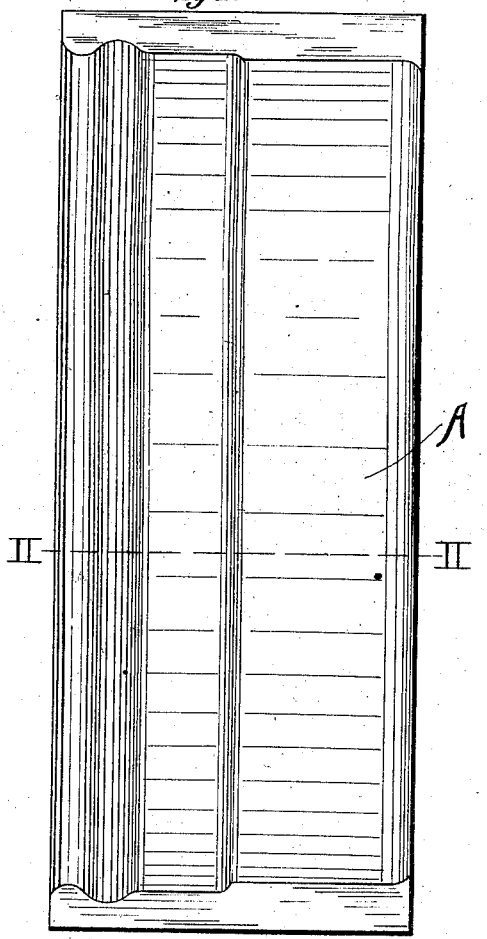
Fig. 2.
Fig. 3.
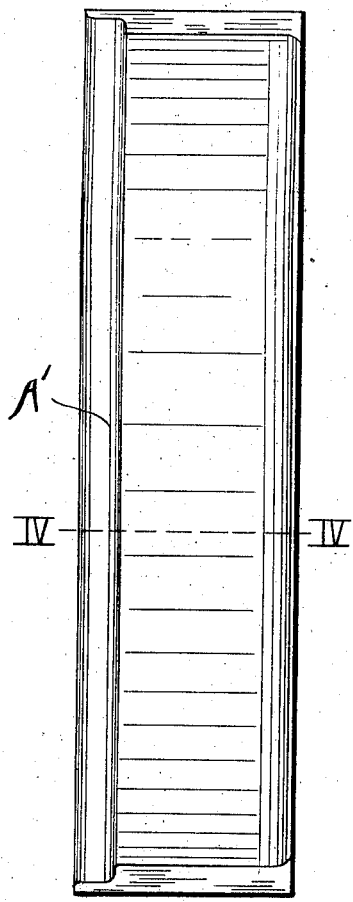
Fig. 4.
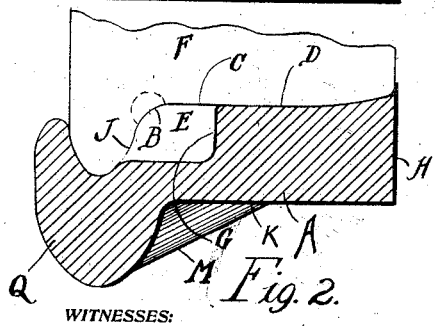
WITNESSES:
Alfred Y. Andrews
Gerald W. Cunningham
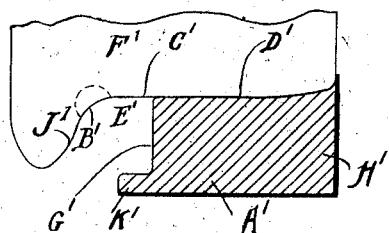
INVENTOR
Samuel P. Bush
BY
Lynnestreett & Carpenter
ATTORNEYS S. P. BUSH.
BRAKE SHOE.
APPLICATION FILED JAN. 21, 1908.
902,206.
Patented Oct. 27, 1908.
2 SHEETS—SHEET 2.
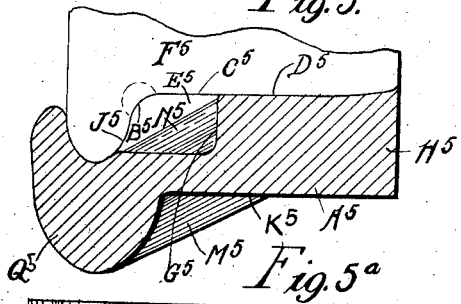
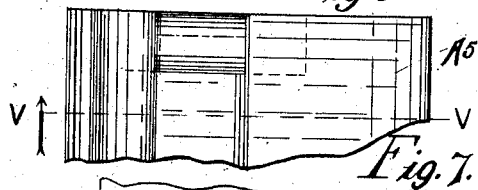
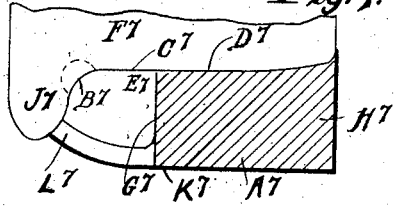
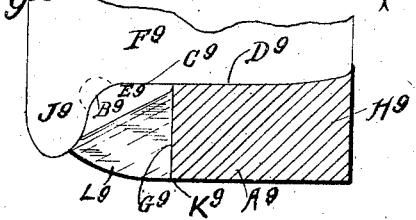
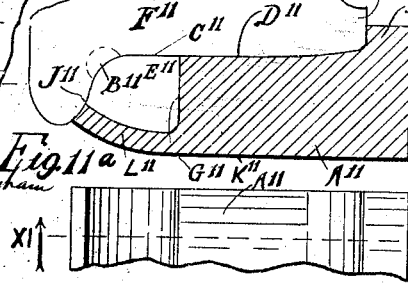
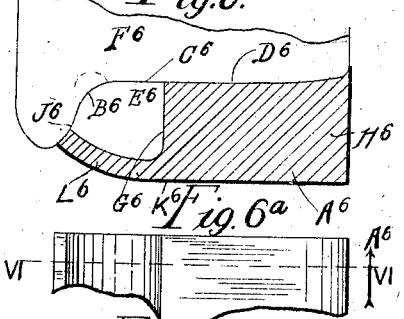
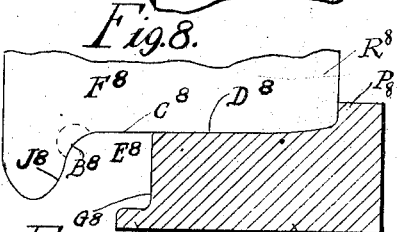
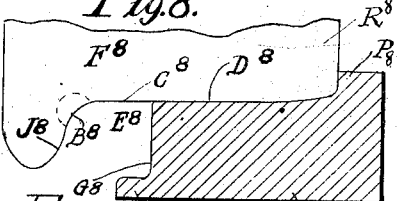
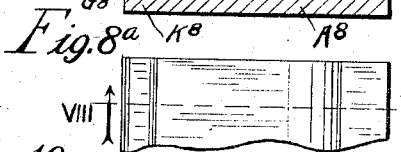
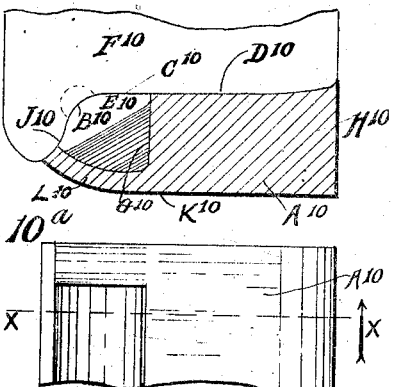
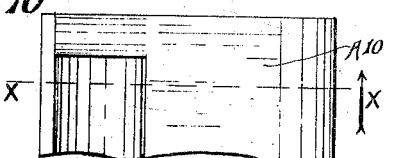
WITNESSES:
Alfred Y. Andrews
Gerald W. Cunningham
INVENTOR
Samuel P. Bush
BY
Synnestvedt & Carpenter
ATTORNEYS

UNITED STATES PATENT OFFICE.

SAMUEL P. BUSH, OF COLUMBUS, OHIO.

BRAKE-SHOE.

No. 902,206.

Specification of Letters Patent.

Patented Oct. 27, 1908.

Application filed January 21, 1908. Serial No. 411,995.

*To all whom it may concern:*

Be it known that I, SAMUEL PRESCOTT BUSH, a citizen of the United States, residing in Columbus, in the county of Franklin and State of Ohio, have invented certain new and useful Improvements in Brake-Shoes, of which the following is a specification.

This invention has particular reference to the construction of a form of brake shoe which will prevent the application of the shoe to certain portions of the wheel and the flange of the wheel to which it is applied from time to time in service, and so will relieve the weakest portion of the tread of the wheel and adjacent portion of the flange thereof from contact with the said shoe, and which will avoid as far as possible the heating, abrading and compressing strains to which these weakest portions of the wheel are subjected when a brake shoe of the ordinary contour is used.

Under the brake shoe practice usually carried out, it is to be noted that normally the shoe contacts with practically the entire tread of the wheel, including generally the throat of the wheel and those portions of the tread adjacent the flange and of the base of the flange adjacent the throat and tread, or a major part thereof, that is to say, the parts of the tread and flange which are in more or less continuous contact with the rail head.

It is well known to those skilled in the art that a large percentage of the failures of railway car and engine wheels occur through broken wheel flanges, and observation has conclusively shown that most of such failures occur not through flanges that are defective primarily in themselves, but on account of the concentration of heavy loads and heat at the tread of the wheel at and adjacent the throat, excessive forces arise from the load and heat stresses that are set up, which the metal of the wheel is not able to withstand. This concentration is especially apparent in the case of new brake shoes applied to new wheels, where by reason of the coning of the wheel tread the shoe contacts practically at the throat of the wheel alone, and further in the case of the application of new shoes to wheels the tread of which have become somewhat grooved in service from contact with the rail head, where a like undesirable contact with the throat of the wheel takes place. Examination of car wheels broken in service has shown in my experience almost invariably the presence of heat, which is apparent from the oxidization of the metal at the point of fracture. It is apparent that the homogeneity of the metal of the tread and flange, especially at the throat, is destroyed by these forces tending to produce fracture, and as the lateral force to which the flange is subject in service adds to the severity of the conditions, the mechanical connection between the flange and tread becomes readily broken. In the case of steel tired wheels there is seen an actual displacement of the hard superficial metal of the tread into the softer metal lying adjacent thereto in the tire, and a forcing outward of such softer metal into the tread proper. This is especially true of the throat portions.

In the practice of my invention, I carry out the plan illustrated in the accompanying drawings, wherein—

Figure 1 is a plan view of the wearing face of a flanged brake shoe showing my improved form of construction;

Figure 2 is a sectional elevation taken on the line II—II of Figure 1;

Figure 3 is a plan view of plain (unflanged) driver or car shoe showing my improved form of construction;

Figure 4 is a sectional elevation taken on the line IV—IV of Figure 3;

Figures 5, 5ª; 6, 6ª; 7, 7ª; 8, 8ª; 9, 9ª; 10, 10ª; and 11, 11ª are modified types of shoes having my improved form of construction ilustrated therein, the first and second members of the pairs being respectively sectional and partial plan views of such shoes, the sectional views in each instance being taken on the line indicated by a corresponding Roman numeral in the plan views.

Referring to the construction of shoe marked A (Figures 1 and 2) it will be seen that the inner portion of the wearing face of the shoe—that part adjacent the wheel flange—has been so formed as to avoid contact with the throat region of the wheel F (indicated by dotted lines at the point marked B) and the adjacent portions of the tread and flange receiving the greatest wear in service from the rail head, marked C and J respectively. This construction has been attained by removing a portion of the usual wearing surface D, at E, between the sides of the shoes, G and H. It will be further seen on examining the aplication of the shoe A′ to the wheel F′ in the drawings (Figures 3 and 4) that the sides of the shoe, G′ and H′ are parallel as in the ordinary form of shoe, but that owing to the narrowing of the transverse width of the shoe, I have provided a portion at the back of the shoe K′, of the full normal width. This serves a two-fold purpose, viz: first, that the back of the shoe may be of full width according to standard practice, and adapted to be connected with the usual type of brake-head; and, second, for purposes of reinforcement and strengthening the back, to avoid fracture thereof in service. In the flanged types of shoes such as are shown in Figures 2 and 5, strengthening ribs, M, M⁵, may be provided to prevent the flange, Q, Q⁵ from breaking away from the back K, K⁵, of the shoe. These strengthening ribs or brackets may be distributed along the back of the shoe at such points as will not interfere with the brake head.

Referring to Figure 6, it will be noted that I have provided a projecting guide by which the shoe may be maintained at the distance desired away from the flange of the wheel. This guide may extend the entire length of the shoe as indicated at L⁶ (and at L¹⁰ in Figure 10, and at L¹¹ in Figure 11,) or one or more similar guides of short length may be placed as convenient along the edge of the shoe as indicated at L⁷ in Figure 7 (and at L⁹ in Figure 9). For like strengthening purposes as the ribs or brackets M, opposing brackets may be placed on the inner surface of the flange Q, such as shown at N⁵ in Figure 5, and on the inner surfaces of the guide or guides as shown in Figures 9 and 10. Referring to Figures 8 and 11 it will be seen that I have illustrated my invention as applied to the type of shoe often used with bald or unflanged driver wheels, wherein the wearing face of the shoe is extended as at P⁸ short distance along the outer edge of the wheel R⁸ (see Figure 8, and at P¹¹ and R¹¹ in Figure 11.)

It is obvious that the invention above described, with reference to the amount of reduced wearing surface, or the proportion that such surface bears to the back of the shoe, may be varied materially, without departure from the spirit of my invention, and therefore I do not restrict myself to any of the details of construction, or to the particular dimensions or arrangements, shown.

Having thus described my invention, and illustrated its use, what I claim as new and desire to secure by Letters Patent is the following:

1. A brake shoe comprising a flange engaging portion, a rim engaging portion spaced away from the flange engaging portion to avoid contact with the throat of the wheel and a plurality of stiffening ribs on the front of the shoe adjacent the throat.

2. A brake shoe comprising a flange engaging portion, a rim engaging portion, an intermediate portion cut back to avoid contact with the throat of the wheel and a plurality of ribs partially bridging the cut back portion.

3. A brake shoe having its face cut away at the throat of the wheel and provided with a plurality of ribs partially bridging such cut away portion.

4. A brake shoe having its face cut away at the throat of the wheel and provided with a plurality of ribs extending diagonally across the throat of the wheel.

5. A brake shoe comprising a flange engaging portion, a rim engaging portion, an intermediate portion cut back to avoid contact with the throat of the wheel and a plurality of ribs on the back of the shoe opposite the cut away portion.

6. A brake shoe comprising a flange engaging portion, a rim engaging portion, an intermediate portion cut back to avoid contact with the throat of the wheel, a plurality of ribs partially bridging the cut back portion, and a plurality of ribs on the back of the shoe opposite the cut away portion.

7. A brake shoe comprising a flange engaging portion, a rim engaging portion, an intermediate portion cut back to avoid contact with the throat of the wheel and a plurality of ribs in the cut away portion with their faces extending diagonally across the throat of the wheel.

In testimony whereof I have hereunto signed my name in the presence of the two subscribing witnesses.

SAMUEL P. BUSH.

Witnesses:
PAUL CARPENTER,
GERALD W. CUNNINGHAM.